Patented Apr. 22, 1924.

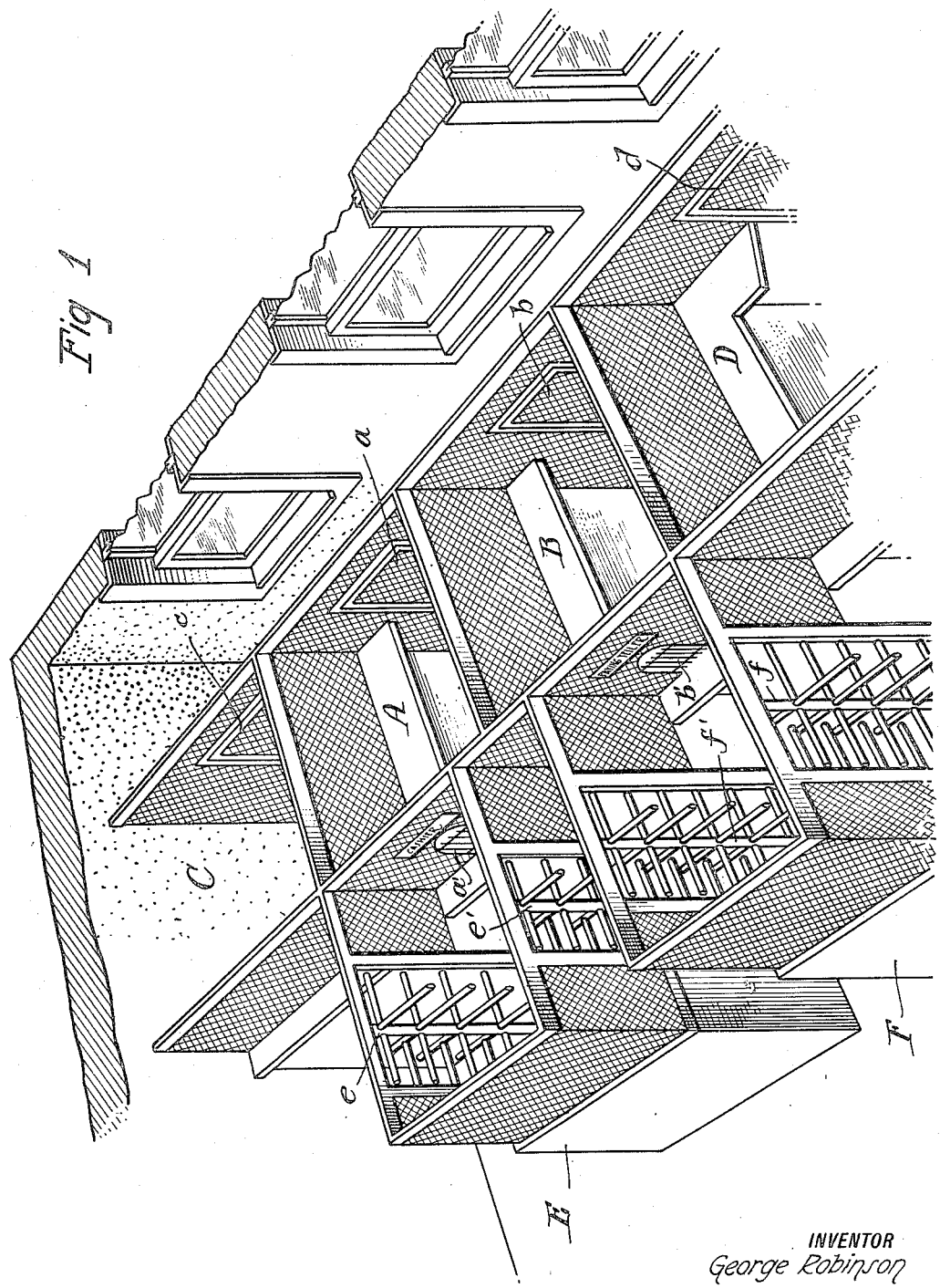

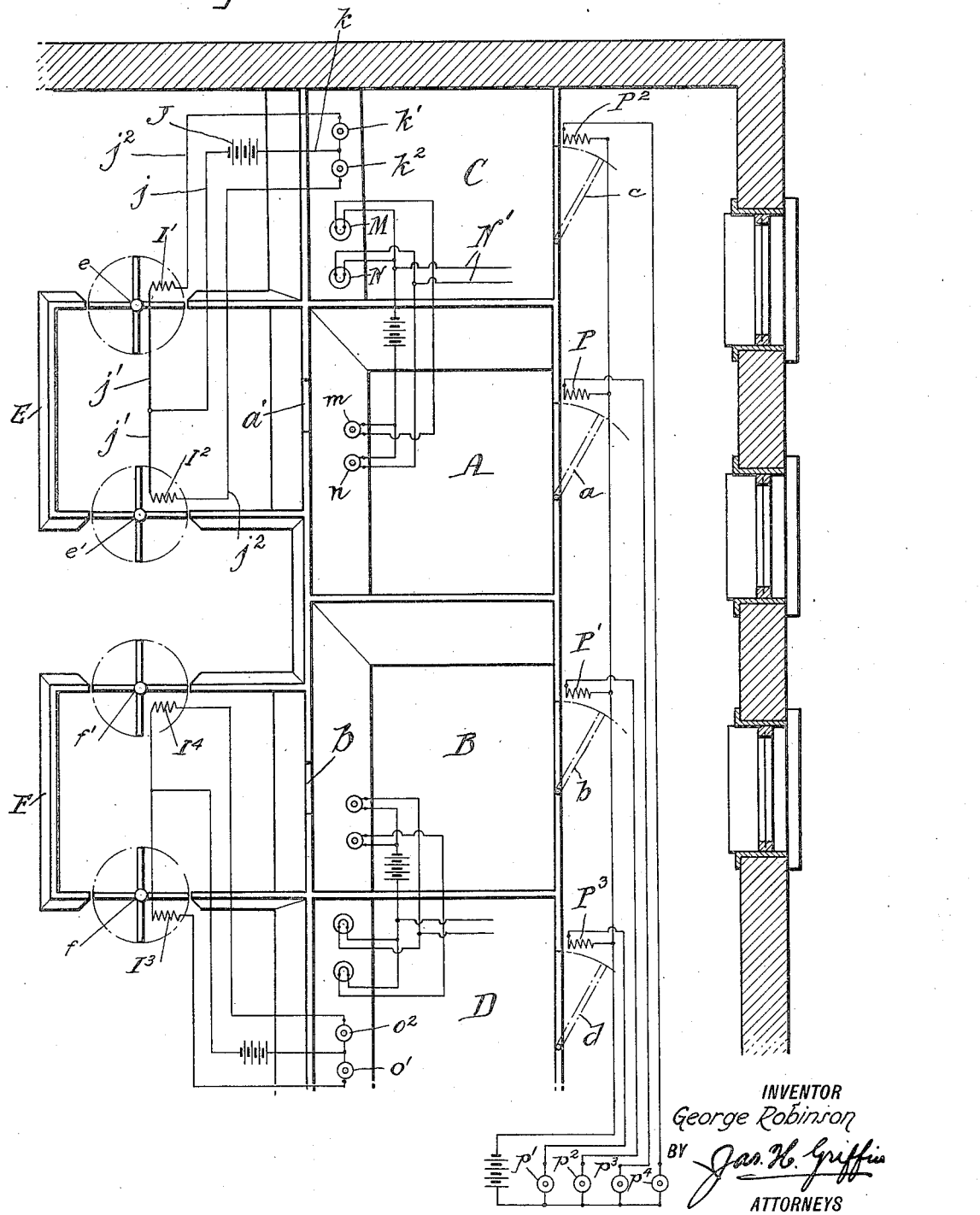

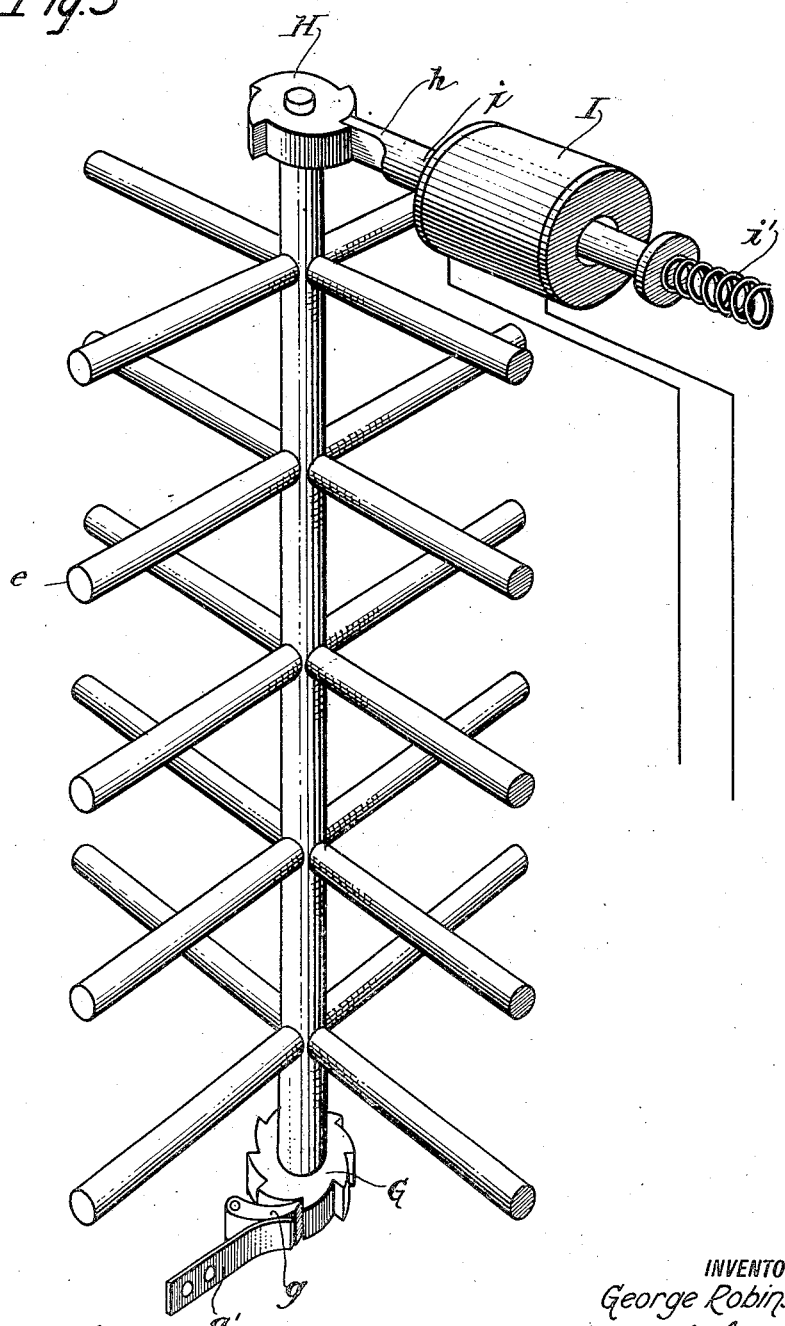

1,490,938

UNITED STATES PATENT OFFICE.

GEORGE ROBINSON, OF BROOKLYN, NEW YORK.

MEANS FOR PROTECTING BANKS AGAINST ROBBERY.

Application filed August 9, 1920. Serial No. 402,420.

*To all whom it may concern:*

Be it known that I, GEORGE ROBINSON, a subject of the King of Great Britain, residing at New York city, borough of Brooklyn, in the county of Kings and State of New York, have invented a certain new and useful Means for Protecting Banks Against Robbery, of which the following is a specification.

This invention relates to the protection of banks and is more particularly directed to a system whereby banks, and other places where money is handled in large quantities, may be protected against burglary or hold-up, during such hours of the working day as it is not feasible to keep money in vaults and when considerable cash is required for immediate use.

The conditions which enable a criminal to quickly approach the paying teller or cashier of a bank, cover him with fire arms, and find the cash within easy access is psychologically, a great temptation to persons criminally inclined. Up to the present time, however, very little has been actually accomplished in preventing surprise attacks, other than to provide private police protection, which has proven entirely inadequate in the event of a surprise attack.

With the foregoing considerations in mind, the object of the present invention is to provide a means for bank protection, which will preclude a successful surprise attack, and, will, at the same time, jeopardize the liberty of a person or persons attempting such an attack.

In the preferred form of the present invention, the entrance to the vicinity of the cashier or paying teller is controlled as well as the exit from such vicinity, so that even though persons gain entrance, they can be precluded from leaving if it is desired to detain them.

Another feature of the invention is to preclude any or all persons, among the bank employees handling money, from leaving their stations, except at the discretion of some official of the bank, so that an employee is not in a position to confederate with an outsider, pass the money to him, and thereafter escape with him.

Features of the invention, other than those specified, will be apparent from the hereinafter detailed description and drawing, when read in conjunction with the accompanying drawings.

The accompanying drawings illustrate one practical embodiment of the invention, but the construction therein shown is to be understood as illustrative, only, and not as defining the limits of the invention.

Figure 1 is a fragmentary perspective view of a bank lay-out with which the present invention is associated.

Figure 2 is a fragmentary plan lay-out of the same bank illustrating electrical controlling means operable by one employee or the other; and, Figure 3 illustrates in perspective detail, in a more or less diagrammatic way, a turn-stile of the character which I may employ in carrying out the present invention.

Although the present invention may be associated with various forms of bank lay-outs, I have chosen, for the purpose of illustration, a bank wherein the various cages for the employees extend along one wall of the bank building and are spaced therefrom to provide an aisle passing along the back of all of the cages. For the purpose of illustration, we will assume that A designates the cashier's cage, B the paying teller's cage, and C and D two cages directly adjacent the cages A and B. The cages C and D may be occupied either by bookkeepers or other employees of the bank or by special attendants.

A convenient and relatively inexpensive manner of associating the present invention with a bank having the type of lay-out shown, is to provide two secondary cages E and F, one of which is placed directly in front of the cashier's window $a'$ and the other of which is positioned directly in front of the paying teller's window $b'$, so that a person approaching the cashier's window must first gain entrance to the cage E, while a person approaching a paying teller's window must first gain entrance to the cage F. Both the cages E and F have closed tops or extend to the ceiling and the same construction is also true of each of the cages A, B, C and D.

In accordance with this invention, the entrance and exit to the respective cages E and F is controlled by an attendant or attendants, through the employment of suitable closures associated with the cages E and F and these closures may be of any form, but are illustrated as turn-stiles, one of which is shown in detail in Figure 3. The cage E has an entrance turn-stile $e$ and an exit turn-stile $e'$, while the cage F has an entrance turn-stile $f$ and an exit turn-stile $f'$. These turn-stiles may be independently operated and are adapted to be normally locked against operation, so that in the normal condition of the system, no one could either enter or leave the cages E or F.

The operation of the turn-stiles may be controlled in various ways, but as shown the control is electrical. Each turn stile is provided at its base with a ratchet wheel G, with which is associated a pawl $g$ maintained at all times in engagement with the ratchet by a spring $g'$. The pawl and ratchet connection described is such as to preclude retrograde rotation of the respective turn-stiles, while each turn-stile is normally precluded from a forward rotation by an electrically operated ratchet connection at the top of the turn-stile. This ratchet connection includes a ratchet wheel H, with which is associated an electrically controlled detent $h$. In the form of the invention shown, this detent is secured to a core $i$ of a solenoid I and the core $i$ is normally impelled toward the ratchet to bring the detent into engagement therewith by a spring $i'$.

This construction normally locks the turn-stile against rotation until such time as the solenoid is energized, whereupon its core is retracted and the detent disengaged from the ratchet for the purpose of allowing the turn-stile to advance. The ratchet H is shown as provided with four teeth corresponding to the four arms of the turn-stile, so that each time the solenoid is energized, the turn-stile will be allowed to pass one person therethrough.

Each turn-stile is provided with a solenoid as described and for the purpose of identification, these solenoids are designated in Figure 2 as $I'$, $I^2$, $I^3$ and $I^4$, which cooperate with the turn stiles $e$, $e'$, $f$, and $f'$, respectively.

In accordance with this invention, the solenoids of the respective turn-stiles are included in electrical circuits by means of which the turn-stiles may be controlled, so as to permit persons to enter or leave the cages E and F, as desired, or to preclude the entrance or exit of such persons. These turn-stiles are controlled from any suitable position or positions and, in practice, they may, if desired, be so wired that the cashier may control the entrance and exit of persons from the cage E, while the paying teller can control the entrance and exit of persons from his cage F. However, in practice, I prefer that some person, other than the cashier or paying teller control the entrance and exit of the cages E and F, and while this person may be a special attendant, I find it economical to have other employees of the bank, who are not normally kept busy with the usual work, attend to the control of the turn-stiles. For example, the bookkeeper, clerk or other employees working in the cage C may control the turn-stiles of the gage E through the three wire electrical circuits shown, while another bookkeeper or other employee working in the cage D may control the turn-stile of the cage F through the three wire circuits shown in conjunction therewith.

The three wire circuit associated with the cage C is energized from any suitable source of current supply J from which leads a common wire $j$, branching at $j'$, to include both solenoids $I'$ and $I^2$. From these solenoids return wires $j^2$ lead to switches $k'$ and $k^2$, which are connected through a return wire $k$ to the source of current supply J. The switches $k'$ and $k^2$ are shown as ordinary push button switches. When the switch $k'$ is operated, the circuit is closed to the solenoid $i'$, thereby permitting the operation of the turn-stile $e$ to allow a person to enter the cage E. When it is desired to allow a person to leave such cage, push button $k^2$ may be pressed to energize the solenoid $I^2$ and allow of the operation of the turn stile $e'$. The push buttons $k'$ and $k^2$ may be positioned in any location within the cage C, and may be either hand or foot operated switches. The employee working in the cage C can readily see a client before the turn-stile and by pressing the button $k'$ may allow him to enter the cage. The turn-stile is immediately locked against retrograde rotation by the pawl $g$, so that a client cannot leave the cage by the turn-stile $e$ and, moreover, cannot leave the cage through the turn-stile $e'$, until the push button $k^2$ is operated. The employee in the cage C preferably receives instructions from the cashier in the cage A before releasing the client and while this information may be communicated verbally, it also may be communicated through electrically operated signals. Such signals may partake of any desired form, but for the purpose of illustration, two lamps M and N are shown, which are electrically connected with two push buttons $m$ and $n$ in the cashier's cage.

By prearrangement, it may be understood, between the operators, that when the cashier presses the button $m$, the lamp M will be illuminated, showing that the client is finished and may be allowed to leave the cage E, whereas when the button $n$ is pushed, the lamp N will be illuminated, showing that the client is of a suspicious character, and should be detained until he can be apprehended.

If desired, I may include in the circuit to the lamp N, a secondary circuit $N'$, connected in any suitable electrical manner to automatic alarm mechanism communicating with police head-quarters or with the head-quarters of a protective agency or with any other suitable central office or local alarm, so that in the event that if it is desired to detain a suspicious person or a prospective robber in the supplemental cage, the operation of the push button n will not only notify the operator in the cage C to detain such suspect, but will automatically and simultaneously notify the central office, police headquarters or give a general alarm.

The same method of control may be had with reference to cage F, the push buttons $o'$ and $o^2$ corresponding with the push buttons $k$ and $k^2$ and the signalling system between the cages B and D, corresponding to that described between the cages A and C. Through this latter signalling system, the paying teller can signal to the turn-stile operator in the cage D, while the latter can control the operations of the turn-stiles.

Moreover, the operators of the turn-stiles are sufficiently removed from the turn-stiles to preclude them from being held up simultaneously with the cashier or paying teller, and the operating push buttons for controlling the turn stiles may be placed in such position that the locality thereof may be protected against gun fire from the outside of the cages in which they are positioned.

In some robberies heretofore successful, there has been collusion between the cashier or paying teller and at the conclusion of the robbery, the bank employee has escaped with the robbers. Such collusion may be obviated under this invention by locking the employees within the cages A, B, C and D and making their release conditional upon the permission of an official of the bank. To this end, the doors, $a$, $b$, $c$ and $d$ by which entrance or exit is had from the respective cages A, B, C and D, may be normally locked by any well known form of electric lock adapted to be unlocked electrically. Such locks are well known and usually include a magnet or solenoid embodying a coil, which when energized, serves to release the lock.

In Figure 2, I have shown six coils, diagrammatically, one for the lock associated with each door and for the purpose of identification have designated such coils P, P', $P^2$ and $P^3$ corresponding to the doors, $a$, $b$, $c$ and $d$. Each coil is connected to the corresponding push button, $p'$, $p^2$, $p^3$ and $p^4$, and these push buttons may be positioned in the office of one of the bank officials so that an employee cannot leave a cage, until the official has been communicated with, either by messenger, telephone or otherwise, and permission granted by such official through the operation of an appropriate button.

It will be noted from the foregoing detail description of the form of system shown, that robbers are precluded from successful concerted action in holding up a bank and the employees of such bank are further precluded from severally conspiring with such robbers, unless all of the employees referred to are in collusion with the criminals and such would never be the case.

In Figure 3 of the drawings, the controlling devices are shown on a somewhat large scale as compared to the turn-stile, but this showing on an increased scale is made in order that the invention may be clearly understood, it being manifest that, in practice, the solenoids and their ratchets, as well as the pawls and their ratchets, would be relatively small and might well be housed within small and inconspicuous casings arranged at the top and bottom of the respective turn-stiles. The showing of such casings has, however, been considered unnecessary, to a full and complete understanding of the invention.

In the foregoing description, persons working in the cages C and D are described as controlling the operations of the turn-stiles. These turn-stiles may be controlled by any other persons especially designated for this purpose, and they need not control these turn-stiles from within the cages C and D. Moreover, the control of the turn-stiles may be accomplished in a purely mechanical manner instead of by the electrical means described and this electrical means may be varied without departing from the spirit of the invention. For these reasons, I wish it understood that the present invention is not restricted to the illustrative showing made, but is to be construed as broadly novel as is commensurate with the appended claims.

Having thus fully described the invention, what I claim as new and desire to secure by Letters Patent is:

1. A bank protective device embodying a plurality of cages in which the employees of the bank are stationed, certain of said cages being provided with normally locked doors to preclude the unauthorized exit of the employee from such cages, and means controllable from a common point or station to unlock the closure of any particular cage and allow of the exit of the employees therefrom.

2. A bank protective device embodying a teller's cage provided with an opening through which business is transacted, a protective cage positioned in front of the teller's cage and through which protective cage persons desiring to do business with the teller are required to pass, a closure controlling the entrance of persons into the protective cage, a lock for normally locking said closure, a closure through which persons are required to pass in leaving the protective cage, a lock for normally locking such closure, an additional cage, and electrical means operable from within the additional cage for controlling said locks.

3. A bank protective device embodying a teller's cage provided with an opening through which business is transacted, a protective cage positioned in front of the teller's cage and through which protective cage persons desiring to do business with the teller are required to pass, a closure controlling the entrance of persons into the protective cage, a lock for normally locking said closure, a closure through which persons are required to pass in leaving the protective cage, a lock for normally locking such closure, an additional cage, electrical means operable from within the additional cage for controlling said locks and an intercommunicating signalling system between the teller's cage and the additional cage whereby the teller may signal for operation of the locks.

In testimony whereof, I have signed my name to this specification.

GEORGE ROBINSON.